United States Patent [19]

Di Maria

[11] Patent Number: 5,609,352
[45] Date of Patent: Mar. 11, 1997

[54] VEHICLE SUSPENSION SYSTEM AND CONTROL VALVE THEREFOR

[76] Inventor: Philip Di Maria, 106 Helen Street, Morwell, Victoria, 3840, Australia

[21] Appl. No.: 373,291

[22] PCT Filed: Jul. 22, 1993

[86] PCT No.: PCT/AU93/00366

§ 371 Date: Feb. 21, 1995

§ 102(e) Date: Feb. 21, 1995

[87] PCT Pub. No.: WO94/02767

PCT Pub. Date: Feb. 3, 1994

[30] Foreign Application Priority Data

Jul. 22, 1992 [AU] Australia .................................. PL3719

[51] Int. Cl.$^6$ .................... B60G 17/01; B60G 21/073; F16K 11/07
[52] U.S. Cl. .................... 280/689; 137/45; 137/625.69; 267/187
[58] Field of Search .................... 137/45, 46, 625.69, 137/625.68; 280/689, 772, 112.2, 709, 714, 723, 6.1; 267/187, 186, 188, 64.16

[56] References Cited

U.S. PATENT DOCUMENTS

| | | | |
|---|---|---|---|
| 2,278,081 | 3/1942 | Kramer | 267/64.16 |
| 2,387,249 | 10/1945 | Eddington | 280/709 |
| 3,533,425 | 10/1970 | Hannan | 137/46 |
| 3,836,166 | 9/1974 | Bainbridge et al. | 267/64.16 |
| 5,106,120 | 4/1992 | Di Maria | 137/45 |

FOREIGN PATENT DOCUMENTS

| | | |
|---|---|---|
| 0253346 | 1/1964 | Australia . |
| 0618732 | 1/1992 | Australia . |
| 1099813 | 2/1961 | Germany . |
| 895095 | 5/1962 | United Kingdom . |
| 1015846 | 1/1965 | United Kingdom . |
| 1478033 | 6/1977 | United Kingdom ............... 137/625.69 |
| 2128142 | 4/1984 | United Kingdom . |

*Primary Examiner*—Brian L. Johnson
*Assistant Examiner*—Peter C. English
*Attorney, Agent, or Firm*—Bell, Seltzer, Park & Gibson, P.A.

[57] ABSTRACT

A control valve for an antiroll suspension for a vehicle, the valve having a body, sliding valve element which is coupled to a pendulum arm through a linkage so that the valve element slides when the pendulum moves on cornering of the vehicle, the valve including a pressure inlet port between lands, a return port and outlet ports which are coupled to hydraulic rams in the vehicle suspension, whereby the valve element operates to control pressure at the outlet ports so as to actuate the rams to thereby reduce body roll on the vehicle. Restricted flow through ducts past pistons and end chambers to ducts and return port provides an increasing pressure differential to generate forces on the valve element which tend to oppose the displacement of the valve element whereby the valve element moves to an equilibrium position which is dependent on the forces transmitted to it from the pendulum arm. An antiroll suspension for a vehicle including the valve is also disclosed.

14 Claims, 11 Drawing Sheets

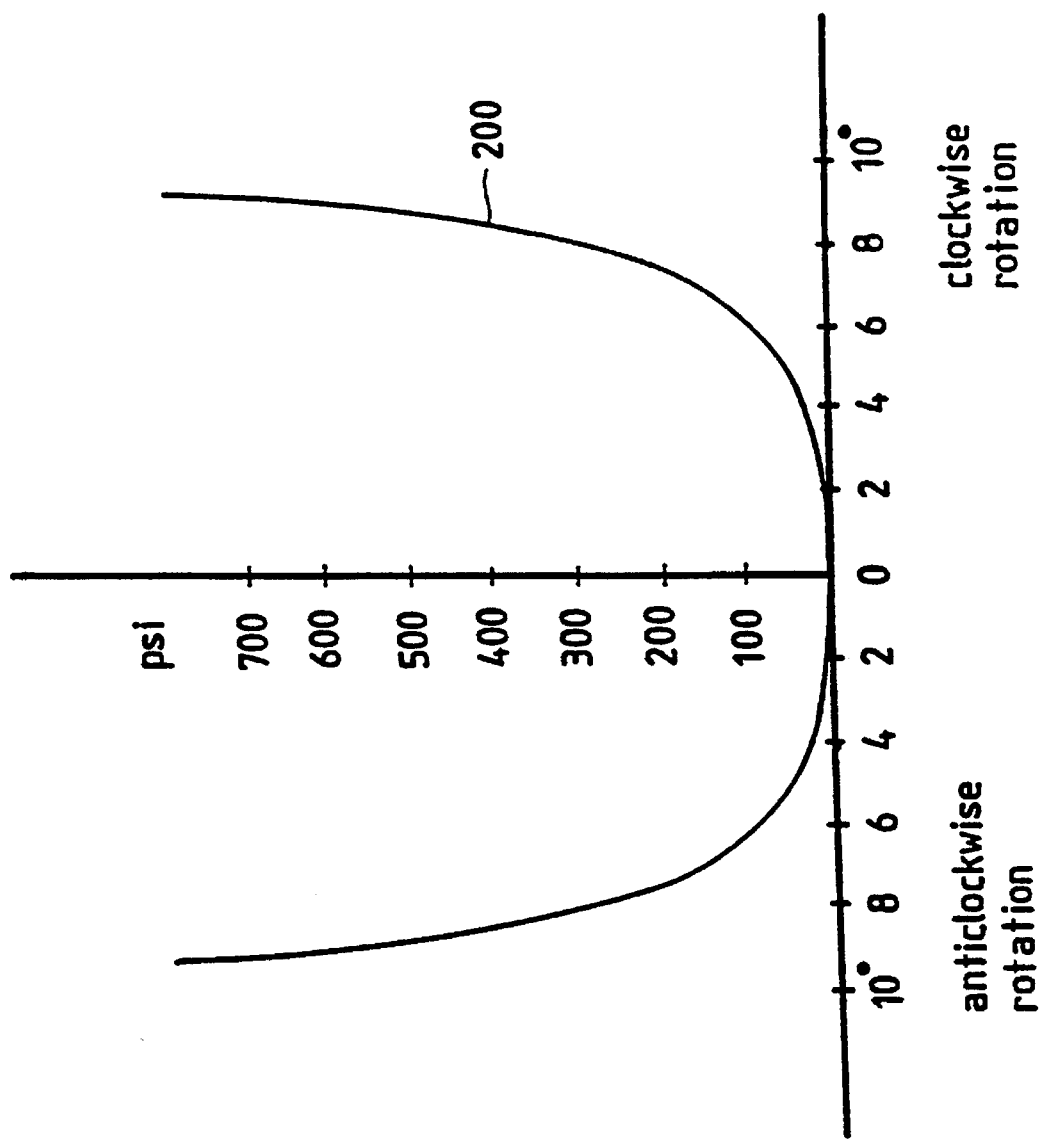

5,609,352

VEHICLE SUSPENSION SYSTEM AND CONTROL VALVE THEREFOR

BACKGROUND OF THE INVENTION

This invention relates to a vehicle suspension system and a control valve therefor.

It is known that when a vehicle such as an automobile travels around a corner, centrifical forces acting on the vehicle tend to cause body roll which if severe can cause instability. The problem is more pronounced with vehicles which have a relatively high center of gravity such as trucks or vans.

Australian Patent No. 618,732 (corresponding to WO 88/07455) discloses an antiroll suspension system for a vehicle. The system includes a pendulum operated control valve. The specification discloses several forms of control valve. The general object of the present invention is to provide an improved and simplified control valve which can be used in antiroll suspension systems of the type disclosed in the patent. Another object is to provide antiroll suspension incorporating the new form of control valve.

According to the present invention there is provided a control valve comprising a valve body, a valve element mounted for sliding movement in the valve body, a control arm, coupling means for translating rotational movement of the control arm to linear displacement of the valve element, to thereby selectively open and close valve ports in the valve body.

The invention also provides an antiroll suspension for a vehicle, said vehicle including a chassis, a pair of wheels mounted on axles, springs acting between the chassis and the axles, the suspension comprising a torsion bar mounted transversely of the vehicle for rotation about an axis, a first arm and a second arm extending from the bar, a third arm and a fourth arm pivotally connected to the first and second arms respectively, the third and fourth arms being coupled to the axis or the chassis of the vehicle wherein at least one of the arms includes an extensible strut which on operation thereof effectively alters the length of said at least one arm and control means to control extension and retraction of said at least one arm and rotation of the torsion bar generally in proportion to laterally directed centrifical forces acting on the vehicle and wherein the control means includes a control valve as defined above.

BRIEF DESCRIPTION OF THE DRAWINGS

The invention will now be further described with reference to the accompanying drawings in which:

FIG. 12 is a graph showing a typical pressure variation versus angular displacement of the valve element.

DETAILED DESCRIPTION OF THE DRAWINGS

Figure 1:
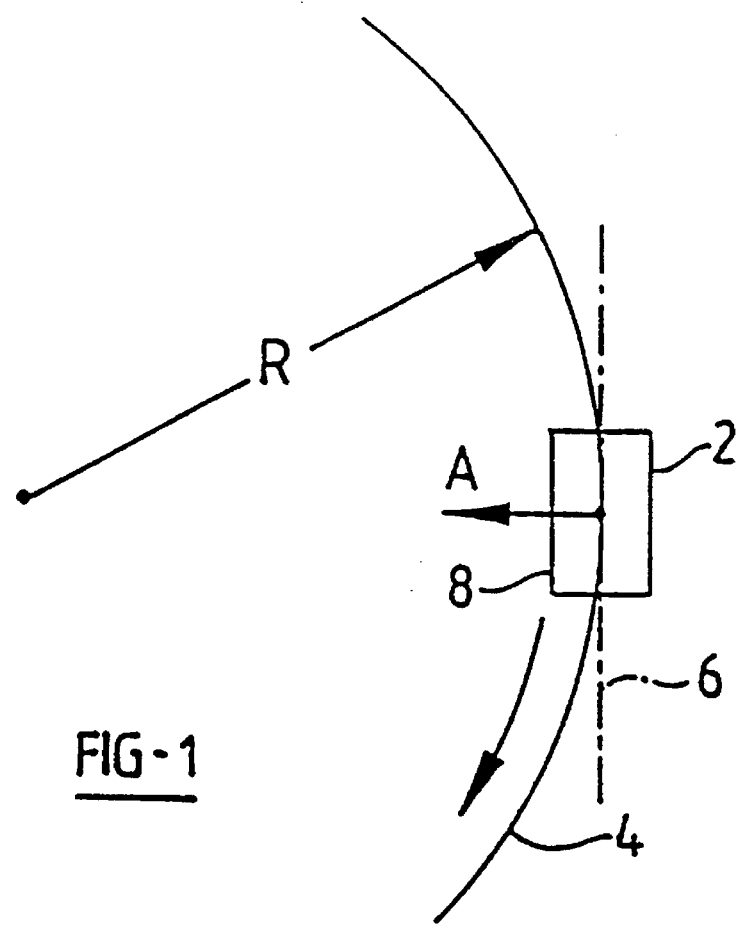
FIG. 1 is a schematic view of a vehicle turning on a circular path.
Figure 2:
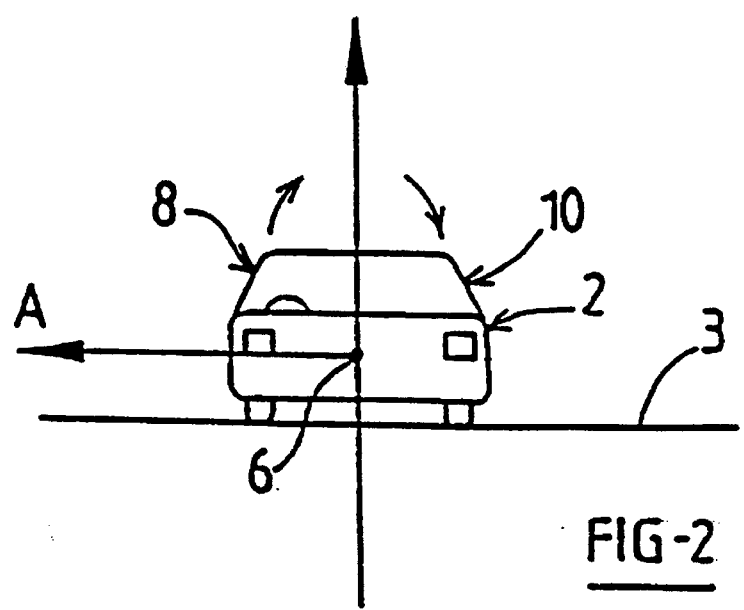
FIG. 2 is a front view of the vehicle.

FIG. 1 shows a vehicle 2 travelling in a circular path 4 of radius R. The vehicle will be subjected to a centrifugal acceleration which is proportional to $V^2/R$ where V is velocity of vehicle. The acceleration tends to rotate the vehicle about an axis 6 which is generally horizontal and tangential to the circular path 4, the inner side 8 of the vehicle tending to lift whereas the outer side 10 of the vehicle tending to move closer to the road 3. In accordance with the invention, the vehicle 2 has modified rear and front suspensions 15 and 17 (see FIG. 3) which tends to counteract the body roll. Thus, on cornering, the suspension tends to raise the side of the vehicle on the outside of the turn and this causes a consequential lowering of the vehicle on the inner side of the turn, as will be explained hereinafter.

Figure 3:
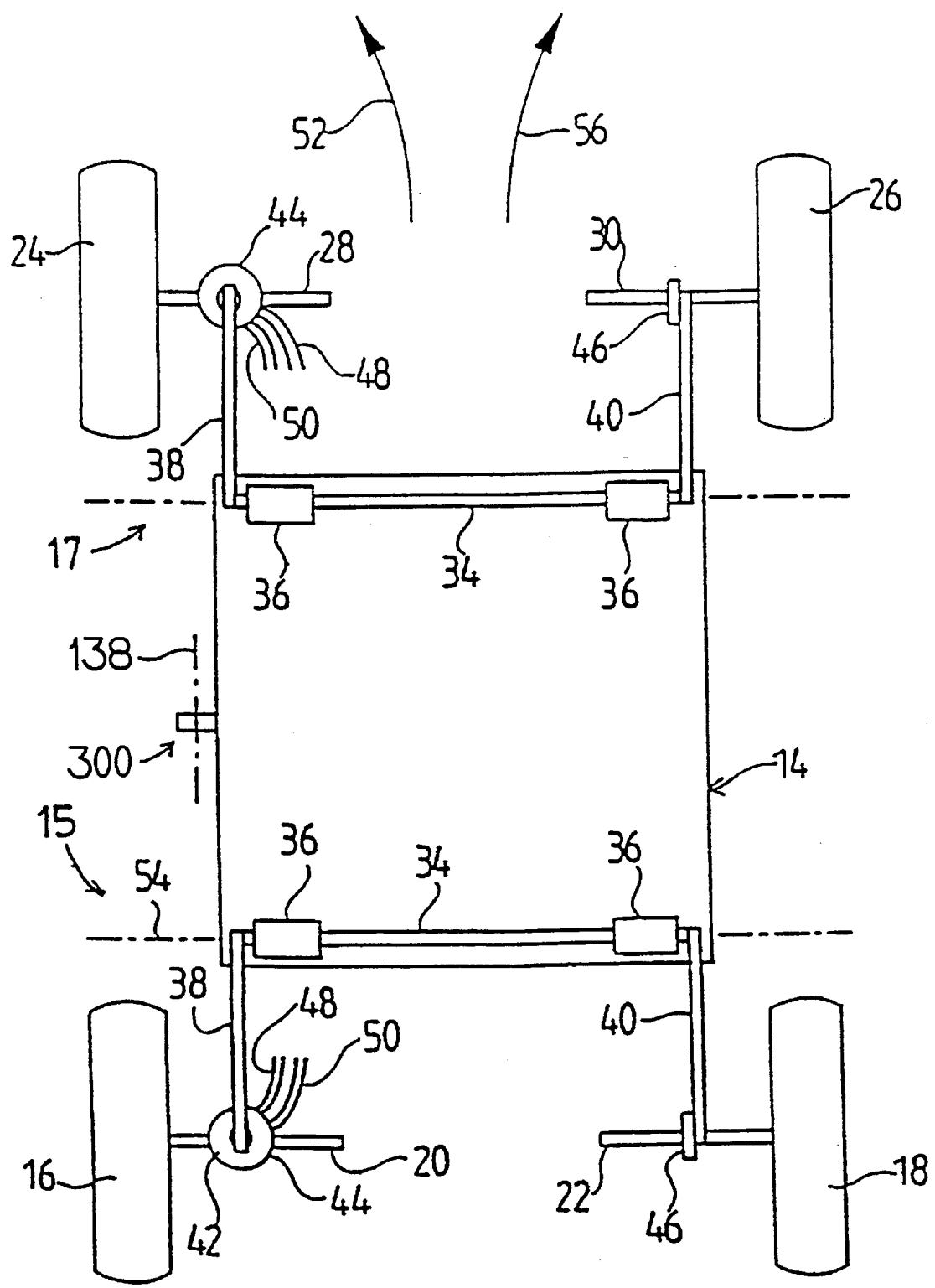
FIG. 3 is a schematic view of a vehicle having the vehicle suspension of the invention.

FIG. 3 diagrammatically illustrates a vehicle chassis 14 to which the rear and front suspensions 15 and 17 of the invention are coupled. The vehicle has rear wheels 16 and 18 mounted on axles 20 and 22. The vehicle has front wheels 24 and 26 mounted on axles 28 and 30. The axles are connected to the chassis 14 by means of springs which can be of conventional design and shock absorbers (not shown) can be fined in the usual way.

The rear suspension 15 includes a bar 34 which extends transversely of the vehicle and upwardly and forwardly of the axles 20 and 22. The bar 34 is mounted for rotation by means of a pair of sleeves 36 provided with rubber bushings (not shown). Rearwardly extending arms 38 and 40 extend from the ends of the bar 34. The free end of the arm 38 is pivotally connected to the upper end of a ram 42 of a double acting hydraulic cylinder 44. The lower end of the cylinder 44 is pivotally connected to the axle 20.

The free end of the arm 40 is connected to a link 46, the lower end of the link being pivotally connected to the axle 22 or the spring coupled to that axle. The length of the link 46 is the same as the effective length of the cylinder and ram 42, in its neutral position, that is to say with equal (or zero) pressure applied to its actuating hydraulic lines 48 and 50. The geometry of the arrangement is such that in the neutral position of the ram 42, the suspension 15 of the invention has substantially zero effect on the vehicle. Thus, if the vehicle is travelling in a straight line or the supply of pressurized fluid to the lines 48 and 50 is discontinued, the conventional suspension on the vehicle will function in its usual way. In accordance with the invention, however, when the vehicle is cornering the pressure to the lines 48 and 50 is altered in such a way as to raise or lower the ram 42 in accordance with the direction of the cornering. This counteracts the effect of body roll and makes the vehicle more stable. More particularly, if the vehicle is travelling in a curved path as indicated by arrow 52, the ram 42 will be withdrawn causing a rotation of the arm 38 and bar 34 about the axis 54 of the bar. At the other side of the vehicle, the arm 40 will be rotated with the bar 34 but the linkage 46 will rotate in such a way as to increase the vertical distance between the axis 54 and the road 3. Because the bar is coupled to the chassis 14 of the vehicle, the effective lowering of the suspension at the inner side of the vehicle tends to counteract the effect of body roll.

When the vehicle travels in a circular path in the opposite direction, as indicated by arrow 56, the ram 42 extends from its neutral position so as to rotate the arm 38, bar 34 and arm 40. This causes an effective increase in the vertical height of the end of the bar 34 relative to the road, at the side of the vehicle where the wheel 16 is located. At the inner side, where the wheel 18 is located, there will be a corresponding reduction in the effective height.

The front suspension 17 functions in an analogous manna and corresponding parts have been given the same reference numerals and, therefore, the operation of the front suspension 17 need not be described in detail. The lines 48 to the front and rear cylinders 44 are connected in parallel as are the lines 50.

Figure 4:
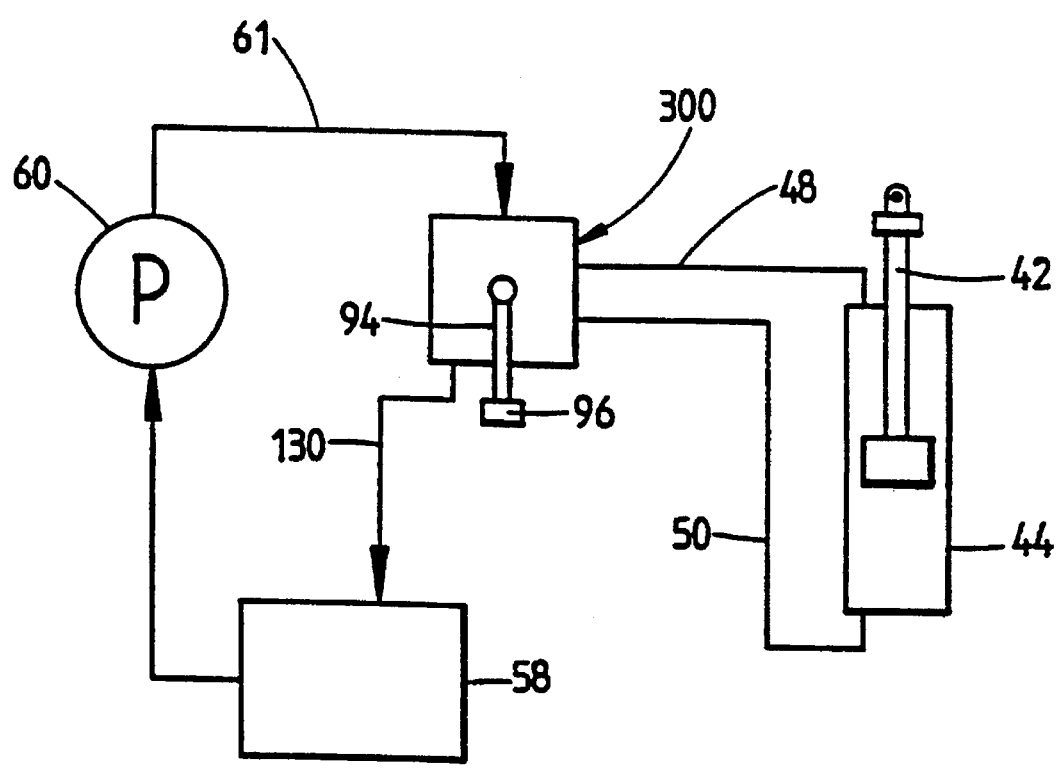
FIG. 4 is a schematic view of a control system for the suspension.

FIG. 4 shows diagrammatically a control system for controlling hydraulic fluid to the front and rear cylinders 44 via the lines 48 and 50. The hydraulic system includes a control valve 300 constructed in accordance with the invention and a reservoir 58 coupled to a pump 60 output from which is connected to the control valve 300 via line 61.

Figure 5:
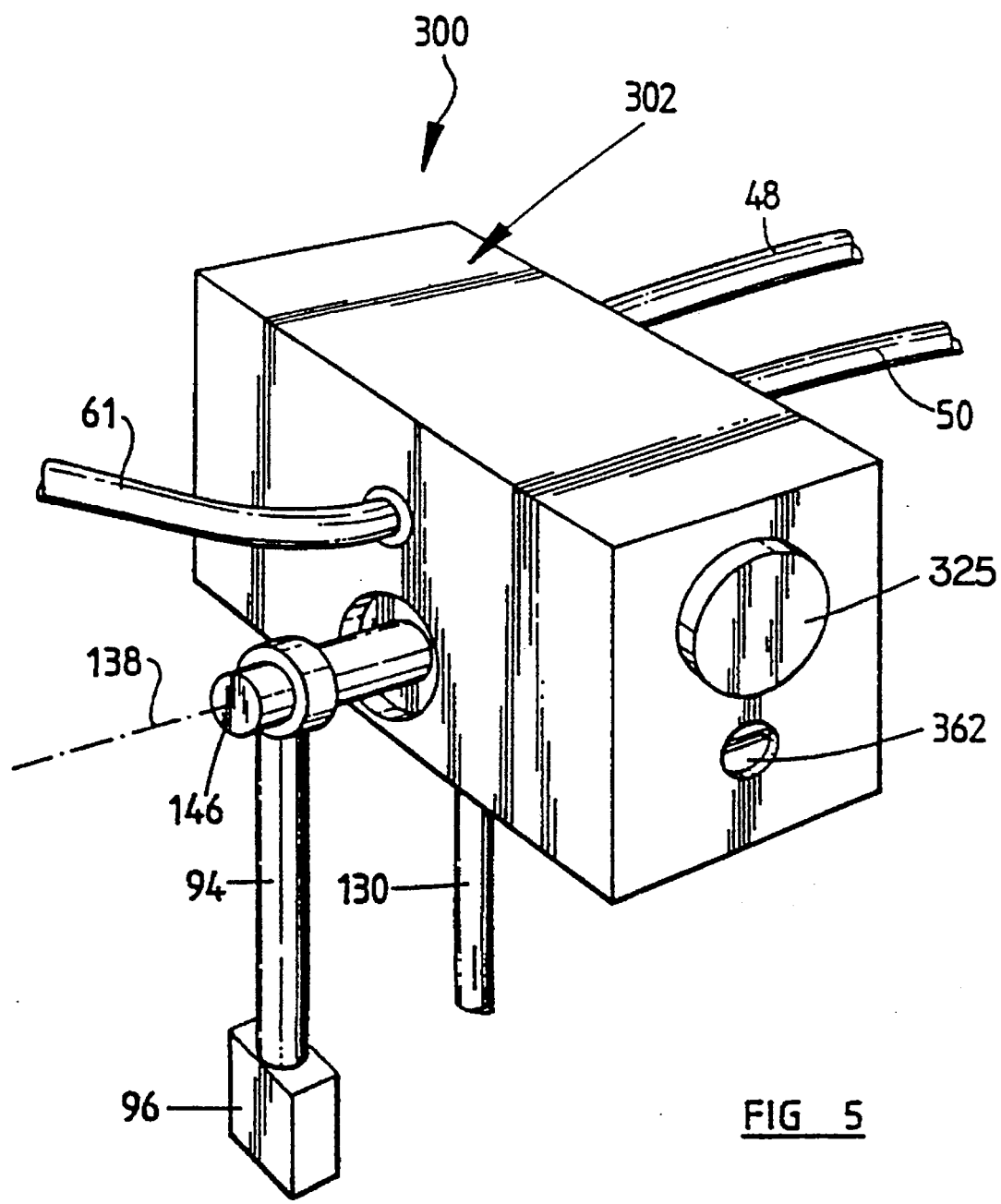
FIG. 5 is a schematic view of a preferred form of control valve in accordance with the invention.
Figure 6:
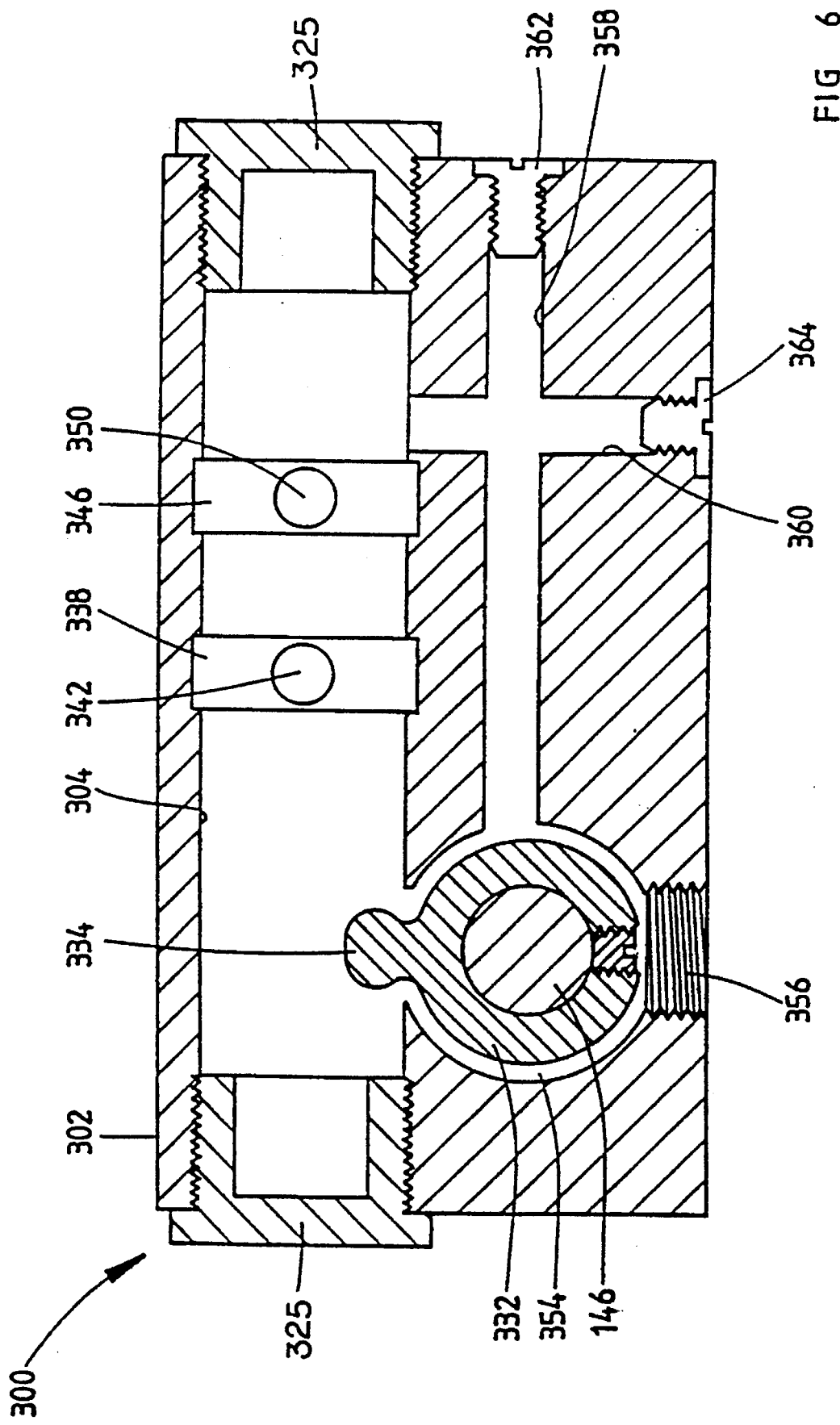
FIG. 6 is a fragmentary sectional view of the control valve with the valve element omitted for clarity of illustration.

FIG. 5 illustrates the preferred form of control valve 300 constructed in accordance with the invention. The control valve 300 can be used in essentially the same way as the control valve 62 and pressure regulator 64 illustrated in the system of FIG. 6 of Australian Patent No. 618,732. The control valve 300 includes a valve body 302 in which is mounted a shaft 146 which is rotatable about an axis 138. In use the control valve 300 is mounted on the vehicle such that the axis 138 is parallel to the longitudinal direction of the vehicle. A pendulum arm 94 and pendulum mass 96 are connected to the shaft 146 so that the arm 94 will be subjected to centripetal forces when the vehicle is cornering. In the preferred arrangement, the mass 96 is in the range from 2 to 300 grams and is centered about 100 mm from the axis 138. As will be described hereinafter, the control valve 300 has a number of ports which communicate with the line 61, the pump 60, output lines 48 and 50 and a return line 130 to the reservoir 58.

Figure 7:
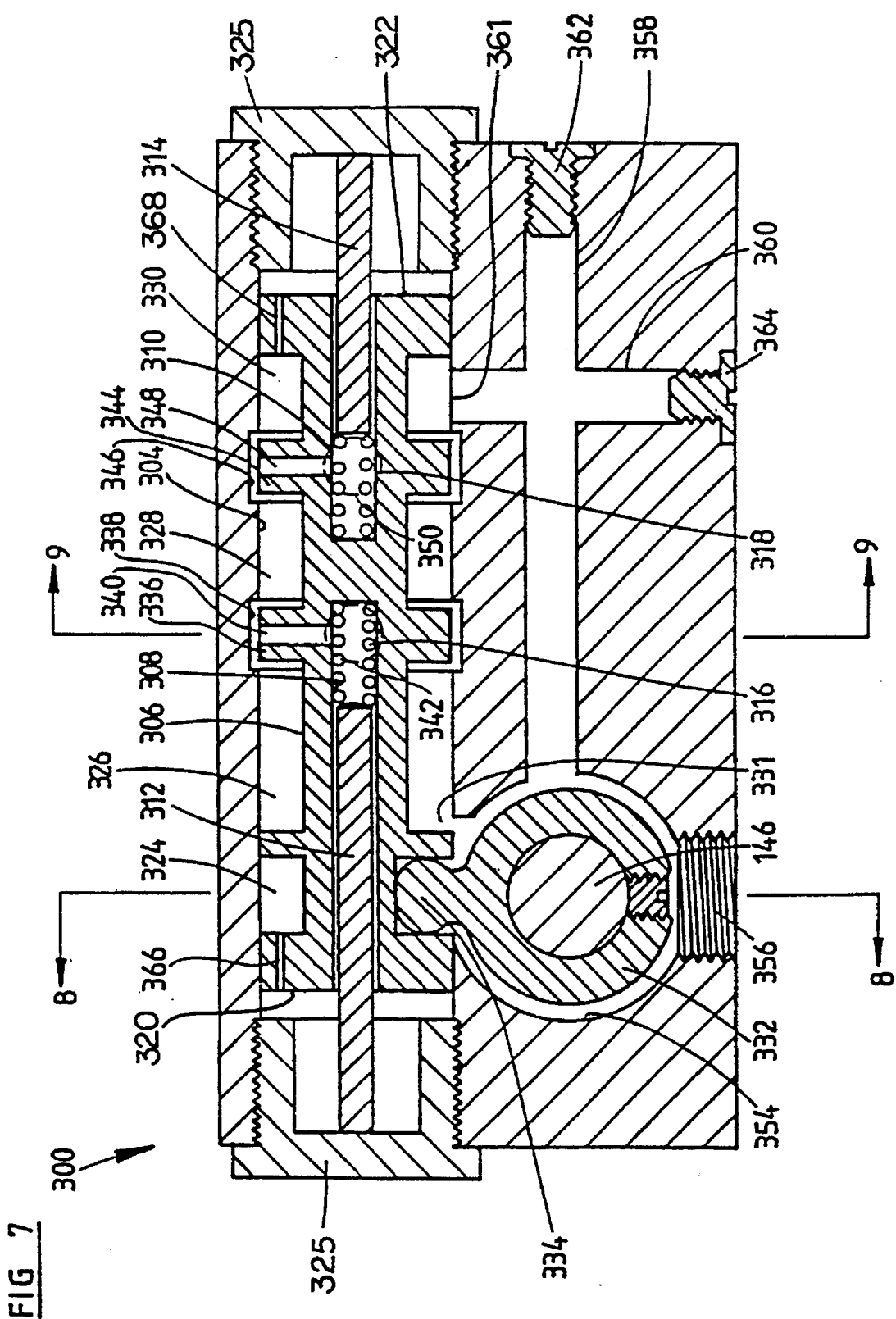
FIG. 7 is a sectional view showing the valve element in a neutral position.
Figure 8:
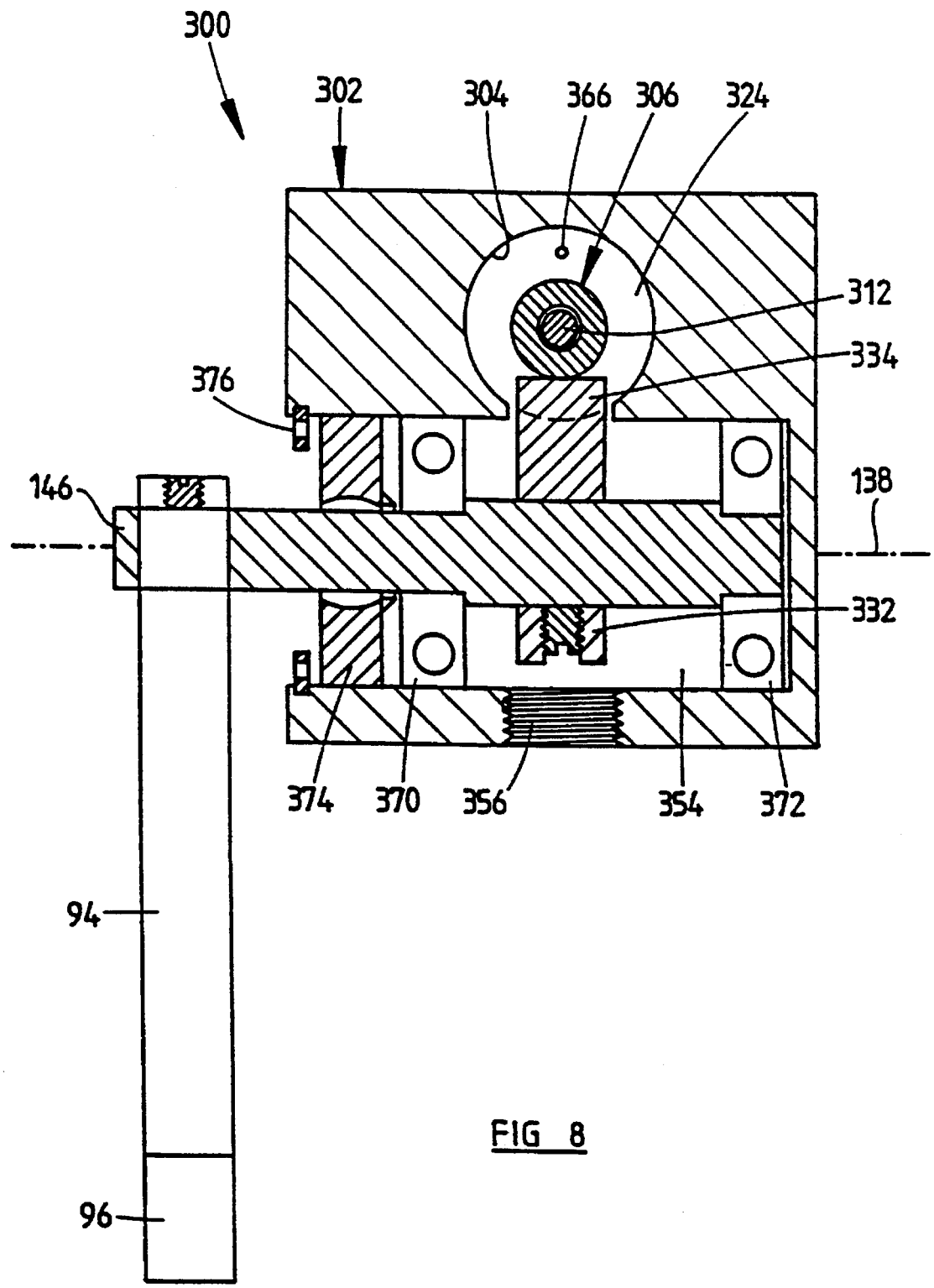
FIG. 8 is a cross sectional view along the line 8—8.

Referring now more particularly to FIGS. 6 to 9, it will be seen that the valve body 302 includes a circular bore 304 within which is slidably mounted a valve element 306. The valve body also includes a transversely extending bore which serves as a return chamber 354 for hydraulic fluid. As best seen in FIG. 8, the shaft 146 is supported by a pair of bearings 370 and 372 which are located in return chamber 354. An oil seal 374 prevents escape of oil from the chamber 354. The oil seal is retained in position by means of a clip 376. The valve element 306 includes longitudinally extending bores 308 and 310 within which are mounted sealingly piston elements 312 and 314 respectively. Compression springs 316 and 318 act between the inner ends of the piston elements and the end faces of the bores 308 and 310 respectively. End caps 325 are threadably mounted in the ends of the bore 304 so as to prevent escape of hydraulic fluid and to limit movements of the piston elements 312 and 314. In an alternative arrangement the springs 316 and 318 could be located so as to act between heads on the outer ends of the piston elements 312 and 314 and the end faces of the valve element 306. The springs keep the ends of the piston elements biased into the end caps 325 at all times (so they could be integral with the respective caps 325.

The valve element 306 is formed from an initially cylindrical body having machined therein a number of grooves which define chambers 324, 326, 328 and 330. The wider diameter pans of the valve body 306 are snugly received within the bore 304 and form seals therewith. The chamber 324 forms part of the coupling of the shaft 146 to the valve element 306. In particular, the shaft 146 has mounted thereon a sleeve 332 having a rounded projecting boss 334. The boss 334 is snugly received within the chamber 324 and the arrangement is such that when the shaft 146 rotates, the rotation of the boss 334 will cause linear displacement of the valve element 306, the direction of displacement depending on the sense of rotation of the shaft 146. As mentioned previously, the shaft 146 is rotated in accordance with the angular acceleration of the vehicle when cornering.

The wider diameter portion of the valve element 306 between the chambers 326 and 328 comprises a cylindrical valve face 336. The valve face 336 cooperates with a shallow recess 338 formed into the face of the bore 304. When the shaft 146 is in its central position (also defining the central position of the valve element 306), the valve face 336 lies wholly within the recess 338 as illustrated. A duct 340 extends from the valve face 336 to the internal bore 308. The recess 338 communicates with an outlet port 342 which in turn is connected to the pressure line 48 to the cylinder.

In a similar way, a second valve face 344 is formed between the chambers 328 and 330. It cooperates with a recess 346 which again is wider than the face 344. The face 344 is provided with a duct 348 which communicates with the bore 310. The recess 346 also communicates with an outlet port 350 which is connected to the line 50 to the other side of the cylinder 44.

Figure 9:
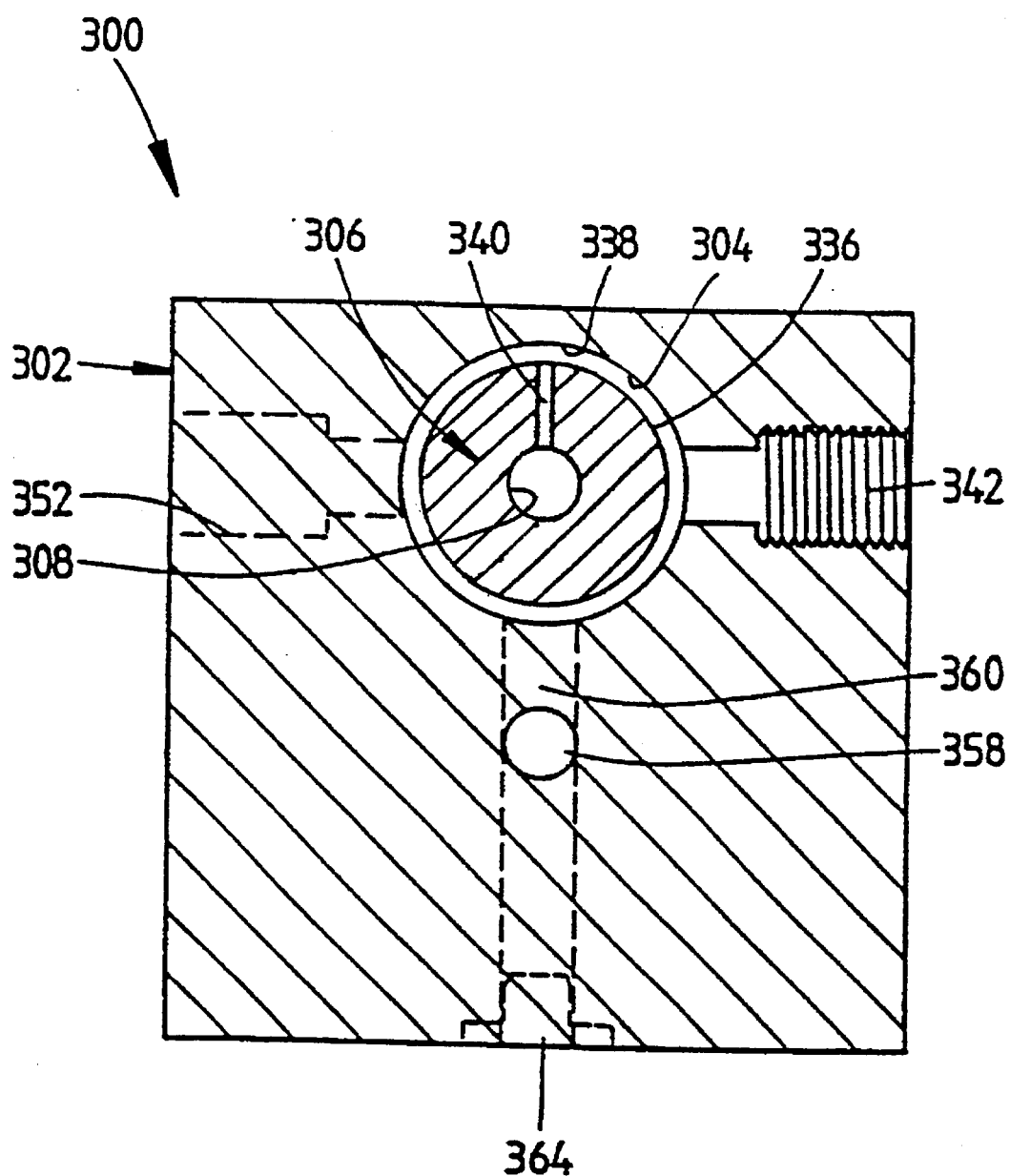
FIG. 9 is a cross sectional view along the line 9—9.

As best seen in FIG. 9, the valve includes an inlet port n 352 which is located between the ports 342 and 350 but on the opposite side of the bore 304. The port 352 is connected to the line 61 which receives pressurized fluid from the hydraulic pump 60. When the valve element 306 is centrally disposed relative to the recesses 338 and 346 as shown in FIG. 7, hydraulic fluid from the port 352 enters the recesses 328 from where it can pass into both of the recesses 338 and 346. From there the hydraulic fluid can flow into the ducts 340 and 348, through the boxrs 308 and 310 and then into the chambers 326 and 330. The hydraulic fluid then flows to a return chamber 354 in which the sleeve 332 is also located via a gap which forms a return port 331 in the bore 304 and which interconnects the chambers 326 and 354, as is apparent from FIG. 7. The chamber 354 has a return port 356 which is coupled to the return line 130 which returns hydraulic fluid to the reservoir 58. Hydraulic fluid from the chamber 330 is returned to the return chamber 354 by means of a pair of interconnecting bores 358 and 360 which are machined into the body 302, the end of the bore 360 forming a return port 361 in the bore 304. The ends of the bores 358 and 360 are closed by plugs 362 and 364. Thus, in the central position of the valve element 306 the fluid pressures within the various chambers will be the same. Because the gap 331 provides a fluid path to the return chamber 354 and the ducts 358 and 360 provide a fluid path to the return chamber 354 at all positions of the element 306, the pressure in the chambers 326 and 330 will always be relatively low and dual to that in the return line 130.

Figure 10:
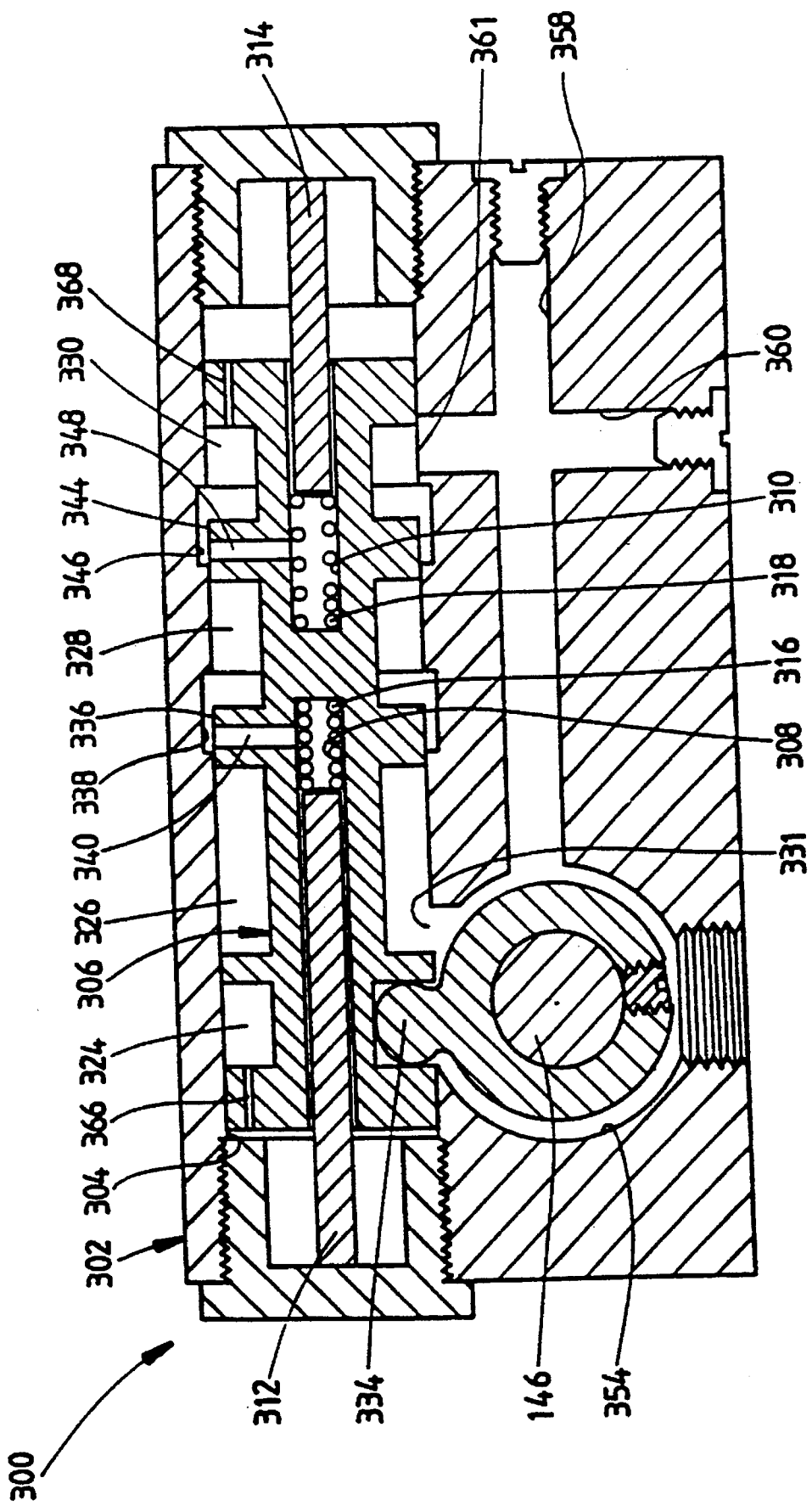
FIG. 10 shows the control valve with the pendulum rotated in an anti-clockwise direction.

If the pendulum arm 94 causes an anti-clockwise rotation of the shaft 146, the valve element 306 will be displaced to the left by a relatively short distance say of the order of 1 mm to the position as illustrated in FIG. 10. The displacement of the valve element 306 however affects the manner in which the valve faces 336 and 344 cooperate with the recesses 338 and 346. More particularly, it will be seen that the valve face 336 engages the bore 304 but the recess 338 is still in fluid communication with the high pressure inlet port 352. Therefore the interior of the bore 308 will now be under high pressure by virtue of the duct 340 and blockage of the fluid path to the return chamber 354 via the chamber 326. On the other hand, the valve face 344 will engage the bore 304 but the chamber 330 will remain at a relatively low pressure because it is still in communication with the return path to the return chamber 354 through the bores 358 and 360.

Accordingly, there will be high pressure in the bore 308 and low pressure in the bore 310 and this tends to cause linear movement of the valve element 306 in the right hand direction which is opposite to the displacement caused by counter-clockwise rotation of the shaft 146. The valve element will move until a point of equilibrium is reached. The result is that there will be relatively high pressure at the port 342 which is generally speaking proportional to the degree of rotation of the shaft 146. A bleed hold 366 communicates from the end face 320 to the chamber 324 to permit escape of hydraulic fluid from the region within the cap 325 and the end face 320 but this does not otherwise affect equilibrium of the valve element 306. Similarly a bleed hold 368 is provided between the end face 322 and the chamber 330. It will be appreciated, however, that the diameter of the bleed holes can act as a dampener on the movement of the valve element 306. It has been found that for an arrangement in which the outer diameter of the valve element 306 is about 15 mm, the bores 308 and 310 are about 4 mm and the bleed holes are about 0.6 mm in diameter is satisfactory. For a 20 mm outer diameter of the valve element 306 bleed holes having a diameter of about 1 mm would be preferred. These diameters can be varied to produce different responses.

Figure 11:
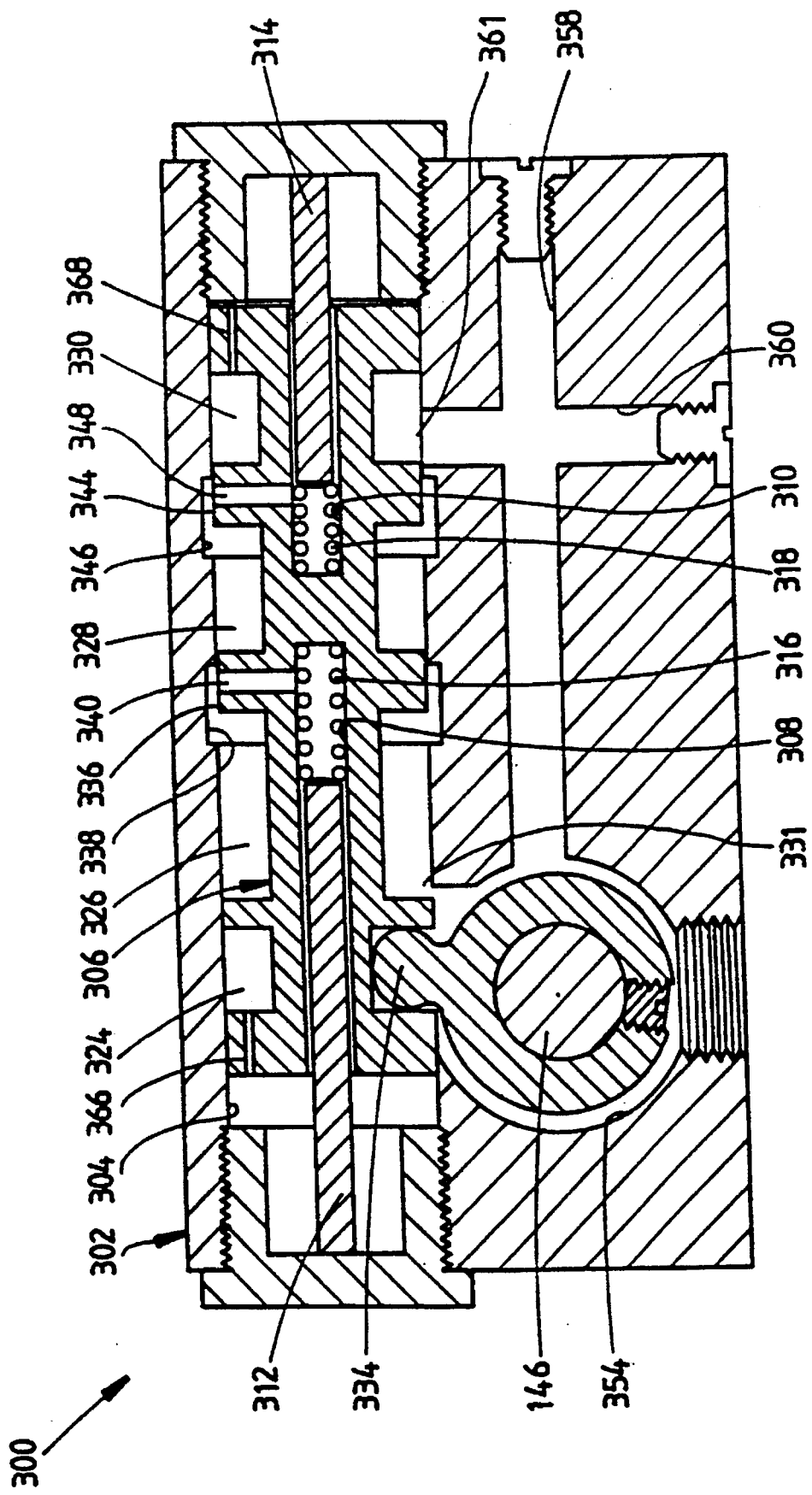
FIG. 11 shows the control valve with the pendulum rotated in a clockwise direction.

When the shaft 146 is stated in a clockwise direction, the valve element will be moved towards the right as illustrated in FIG. 11. In this arrangement the engagement of the valve faces 336 and 344 with the bore 304 cause a build-up of pressure in the bore 310 and low pressure to be maintained in the bore 308. Thus high fluid pressure will be present at the outlet port 350 and low pressure at the outlet port 342 which is the reverse of the previous arrangement and again tends to oppose the displacement of the element 306 caused by the pendulum arm 94.

FIG. 12 graphically represents one arrangement in which the line 200 graphically illustrates a typical example of the pressure in the output lines 48 and 50 as a function of the rotation of the pendulum arm 94 from its central position. In one prototype which has been tested having a pendulum length of 150 mm angular accelerations of one gravity typically produce an output pressure of 450 psi in the lines 48 and 50. In this prototype the length of the arm was about 75 mm and the mass of the pendulum mass 96 about 500 gms.

The variations in pressure in the lines 48 and 50 causes movement of the hydraulic rams provided in the vehicle suspension to thereby miniraise body roll in the vehicle, in a manner which is similar to that described in Australian Patent Specification 618,732. It will be appreciated, however, that the valve 300 is simpler, cheaper and more robust than the known arrangement. It will be appreciated that the illustrated valve 300 can be made from components produced by relatively simple machining operations such as drilling and turning.

Many modifications will be apparent to those skilled in the art without departing from the spirit and scope of the invention.

I claim:

1. A control valve for an antiroll suspension for a vehicle said control valve comprising a valve body having a bore, a valve element mounted for sliding movement in the bore of the valve body, a control arm and coupling means for translating rotational movement of the control arm to linear displacement of the valve element relative to the valve body to thereby selectively control the hydraulic fluid pressure at first and second outlet ports in the valve body, and wherein linear displacement of the valve element in a first direction from a neutral position causes a relatively high pressure at the first outlet port and a relatively low pressure at the second outlet port and linear displacement of the valve element in a second direction from the neutral position causes a relatively high pressure at the second outlet port and a relatively low pressure at the first outlet port, and wherein an inlet port, return ports and the outlet ports are formed in the bore and the valve element includes first and second valve faces which cooperate with the bore so as to control the hydraulic fluid pressure at the outlet ports and wherein the bore includes first and second recesses which cooperate with the first and second valve faces on said element, the arrangement being such that in the neutral position of the valve element hydraulic fluid in use passes from the inlet port through said recesses to said return ports and the first and second outlet ports are at substantially the same pressure, said control valve including balancing means to generate forces on said valve element which tend to oppose said displacements in the first and second directions whereby the valve element moves to an equilibrium position which is dependent upon the forces transmitted to it from the control arm and wherein the balancing means includes first piston means slidable relative to a first bore in the valve element and second piston means slidable relative to a second bore in the valve element and wherein said first and second bores are in fluid communication with said inlet port in accordance with displacements of the valve element and wherein said first and second valve faces include first and second ducts respectively to provide hydraulic fluid paths between the first and second bores to said first and second recesses respectively.

2. A valve as claimed in claim 1 wherein when the valve element is displaced in said first direction, the first duct provides a fluid path between the first bore and the inlet port but the second valve face sealingly engages the bore to isolate the second duct from the inlet port whereby the fluid pressure in the first bore is greater than that in the second bore and the pressure differential tends to move the valve element in said second direction to said equilibrium position.

3. A valve as claimed in claim 2 wherein, when said valve element is displaced in said second direction, the second duct provides a fluid path between the second bore and the inlet port but the first valve face sealingly engages the bore to isolate the first duct from the inlet port whereby the fluid pressure in the second bore is greater than that in the first bore and the pressure differential tends to move the valve element in said first direction to said equilibrium position.

4. A valve as claimed in claim 3 wherein the first and second piston means are in a fixed location relative to the valve element.

5. A valve as claimed in claim 4 wherein the first and second outlet ports are provided in said first and second recesses respectively and wherein the inlet port is located between said first and second recesses.

6. A valve as claimed in claim 2 wherein the valve element includes bleed holes which permit fluid in the bore to flow to an outlet chamber during said displacements of the valve element.

7. A valve as claimed in claim 6 wherein the sizes of the bleed holes is selected to provide a damped movement of the valve element.

8. An antiroll suspension system for a vehicle comprising a suspension having an hydraulic ram mounted therein for altering the characteristics of the suspension and a control valve as claimed in claim 1, the outlet ports of which are coupled by fluid lines to said ram to control the operation thereof.

9. An antiroll suspension for a vehicle, said vehicle including a chassis, a pair of wheels mounted on axles, spring acting between the chassis and the axles, the suspension comprising a torsion bar mounted transversely of the vehicle for rotation about an axis, a first arm and a second arm extending from the bar, a third arm and a fourth arm pivotally connected to the first and second arms respectively, the third and fourth arms being coupled to the axles or the chassis of the vehicle wherein at least one of the arms includes an extensible strut which on operation thereof effectively alters the length of said at least one arm and control means to control extension and retraction of said at least one arm and rotation of the torsion bar generally in proportion to laterally directed centrifical forces acting on the vehicle and wherein the control means includes a control valve as claimed in any one of claim 1.

10. A control valve for an antiroll suspension for a vehicle, said control valve comprising a valve body having an inlet port for coupling to a source of high pressure hydraulic fluid, return port means for returning hydraulic fluid to said source and first and second outlet ports, a valve element mounted for sliding movement in the valve body, a control arm and coupling means for translating rotational movement of the control arm to linear displacement of the valve element relative to the valve body to thereby selectively control the hydraulic fluid pressure at said outlet ports in the valve body, said coupling means being located in said return port means and wherein linear displacement of the valve element in a first direction from a neutral position causes a relatively high pressure at the first outlet port and a relatively low pressure at the second outlet port and linear displacement of the valve element in a second direction from the neutral position causes a relatively high pressure at the second outlet port and a relatively low pressure at the first outlet port, said valve including balancing means to generate forces on said valve element which tend to oppose said displacements in the first and second directions whereby the valve element moves to an equilibrium position which is dependent upon the forces transmitted to it from the control arm, said valve further including means to damp movement of the valve element, said valve body includes a bore in which said inlet port and the first and second outlet ports are formed and wherein the valve element includes first and second valve faces which cooperate with the bore so as to control the hydraulic fluid pressure at the outlet ports and the bore includes first and second recesses which cooperate with the first and second valve faces on said element, said valve faces having first and second ducts respectively to provide hydraulic fluid paths between first and second bores in the valve element to said first and second recesses respectively, the arrangement being such that in the neutral position of the valve element hydraulic fluid in use passes from the inlet port through said recesses to said return port means and the first and second outlet ports are at substantially the same pressure, and wherein the balancing means includes first piston means slidable relative to the first bore and second piston means slidable relative to the second bore and wherein said first and second bores are in fluid communication with said inlet port in accordance with displacements of the valve element.

11. A valve as claimed in claim 10 wherein when the valve element is displaced in said first direction, the first duct provides a fluid path between the first bore and the inlet port but the second valve face sealingly engages the bore to isolate the second duct from the inlet port whereby the fluid pressure in the first bore is greater than that in the second bore and the pressure differential tends to move the valve element in said second direction to said equilibrium position.

12. A valve as claimed in claim 11 wherein, when said valve element is displaced in said second direction, the second duct provides a fluid path between the second bore and the inlet port but the first valve face sealingly engages the bore to isolate the first duct from the inlet port whereby the fluid pressure in the second bore is greater than that in the first bore and the pressure differential tends to move the valve element in said first direction to said equilibrium position.

13. A valve as claimed in claim 12 wherein the first and second piston means are in a fixed location relative to the valve element.

14. A valve as claimed in claim 13 wherein the first and second outlet ports are provided in said first and second recesses respectively and wherein the inlet port is located between said first and second recesses.

* * * * *

UNITED STATES PATENT AND TRADEMARK OFFICE
CERTIFICATE OF CORRECTION

PATENT NO. : 5,609,352
DATED : March 11, 1997
INVENTOR(S) : Di Maria

It is certified that error appears in the above-identified patent and that said Letters Patent is hereby corrected as shown below:

Title page, item [30],
FOREIGN PATENT DOCUMENTS

2128142 - date should be 4/82 rather than 4/84

Column 1, after the title, before "BACKGROUND", insert --FIELD OF THE INVENTION--.

Column 3, line 9, "manna" should be --manner--.

Column 3, line 45, "8" should be --8--.

Column 4, line 28, after "port" delete "n".

Column 4, line 34, "recesses" should be --chamber--.

Column 4, line 55, "dual" should be --equal--.

Column 5, line 31, "stated" should be --rotated--.

Column 6, line 64, (Claim 6) claim dependency should be "5" rather than "2".

UNITED STATES PATENT AND TRADEMARK OFFICE
CERTIFICATE OF CORRECTION

PATENT NO. : 5,609,352
DATED : March 11, 1997
INVENTOR(S) : Di Maria

It is certified that error appears in the above-identified patent and that said Letters Patent is hereby corrected as shown below:

Column 7, line 12, (claim 9) "spring" should be --springs--.

Signed and Sealed this

Tenth Day of March, 1998

Attest:

BRUCE LEHMAN

Attesting Officer

Commissioner of Patents and Trademarks